Dec. 11, 1928.
N. A. CARLSON
1,694,407
TANK DISCHARGE CONTROLLING MECHANISM
Filed Aug. 6, 1927
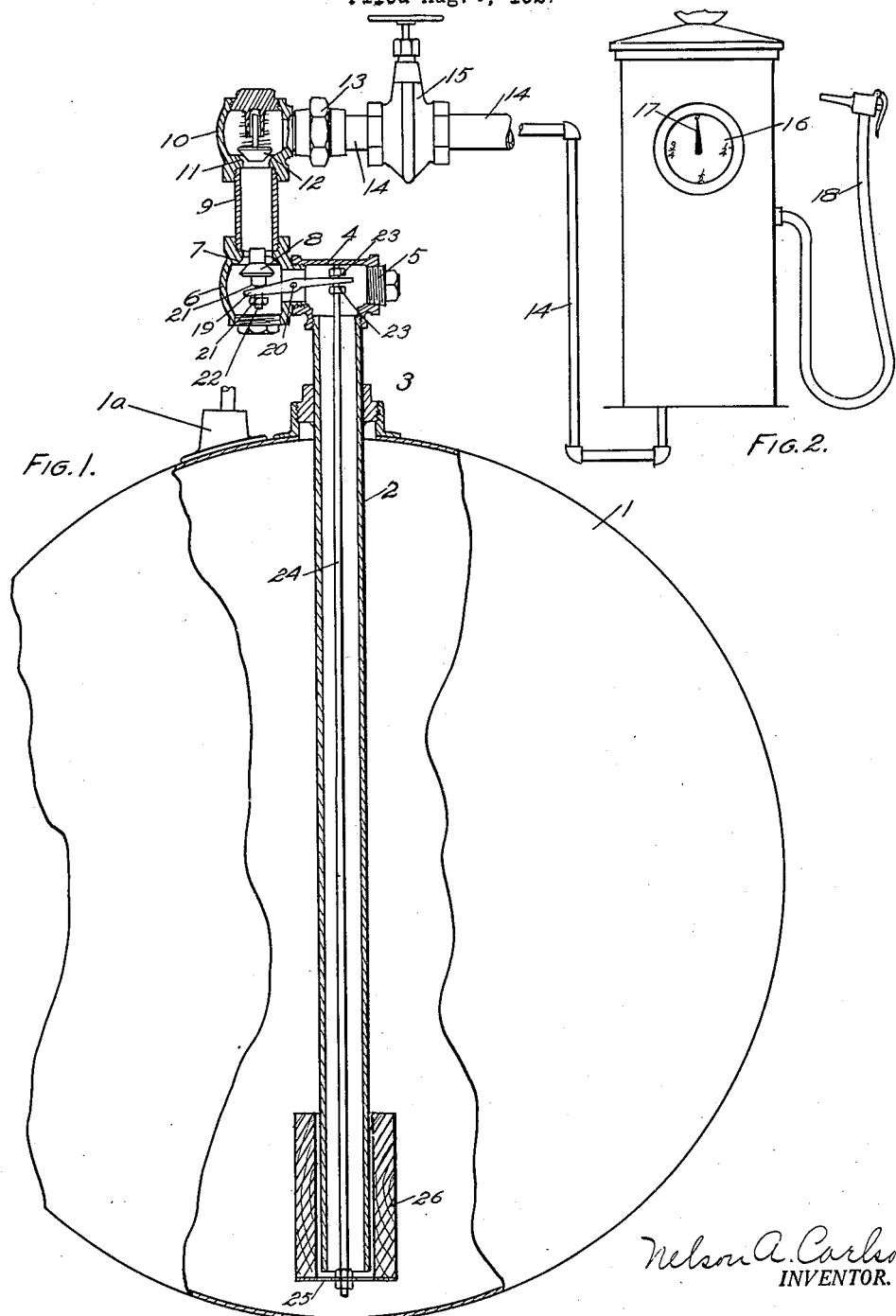

Patented Dec. 11, 1928.

1,694,407

UNITED STATES PATENT OFFICE.

NELSON A. CARLSON, OF ERIE, PENNSYLVANIA, ASSIGNOR TO ERIE METER SYSTEMS, INC., OF ERIE, PENNSYLVANIA, A CORPORATION OF PENNSYLVANIA.

TANK-DISCHARGE-CONTROLLING MECHANISM.

Application filed August 6, 1927. Serial No. 211,177.

In dispensing tanks, particularly such tanks as are used in connection with filling stations handling gasoline difficulty is often experienced where the tank is emptied of gasoline and there is a following flow of pressure gas, or air through the dispensing line. Where this happens the ordinary meter as used will continue registering. This interferes with the total reading of the meter in any event and if the flow of air happens during a dispensing operation to a customer the over-running of the meter incident to the flow of air makes it impossible to have a correct reading as to the actual gasoline delivered. The present invention is designed to obviate this difficulty. Features and details of the invention will appear from the specification and claims.

A preferred embodiment of the invention is illustrated in the accompanying drawings as follows:—

Fig. 1 shows a sectional view of the device.

Fig. 2 a view of the meter through which the gasoline is dispensed.

1 marks the tank and 2 a discharge tube from the tank. This is carried in a fitting 3 and extends to near the bottom of the tank as is the common practice. Air under pressure is supplied through a fitting 1ª from any convenient source of supply so that the gasoline is forced from the tank through this air pressure.

The pipe 2 terminates in a T 4 closed at one end by a plug 5. An angle valve 6 is secured in the opposite end of the T. This angle valve has a valve seat 7 on which a valve head 8 operates. A pipe 9 extends from the valve 6 to an angle valve 10. The angle valve 10 has a seat 11 and a check valve 12 preventing a return flow. The angle valve is connected through a union 13 with a pipe 14, the pipe having an ordinary shut-off valve 15. The pipe 14 leads to a meter 16, these meters having ordinarily a rotating part 17 responding to the flow of fluid and the gasoline passes from the meter to a dispensing hose 18.

A lever 19 is pivoted at the inlet side of the angle valve 6 on a pin 20. The valve engages shoulders 21 arranged on an extension 22 projecting from the valve 8. The opposite end of the lever 19 engages shoulders 23 on a rod 24. The rod extends downwardly through the outlet tube 2 to a cross plate 25 to which the rod is secured. A float 26 is secured to the cross plates and surrounds the tube 2, the tube, therefore, forming a guide for the float.

In the operation of the device when the gasoline reaches a pre-determined low level the float drops carrying with it the rod 24 and this operating through the lever 19 lifts the valve 8 to its seat where it is held not only by the weight of the float but also by the pressure operating on the valve. When, however, the tank is refilled the pressure in the tank is reduced for the filling operation which releases the pressure on the valve 8 and the buoyancy of the float as the tank is filled assures the re-opening of the valve.

What I claim as new is:—

1. In a tank discharge controlling mechanism, the combination of a tank; a discharge conduit leading from the tank; a meter in the conduit; and means closing the conduit at a pre-determined level of liquid in the tank comprising a float, a valve in the conduit outside of the tank, and devices communicating through the conduit the movement of the float to the valve.

2. In a tank discharge controlling mechanism, the combination of a tank; a discharge conduit leading from the tank; a meter in the conduit; and means closing the conduit at a pre-determined level of liquid in the tank comprising a float outside of the conduit, a valve in the conduit above the tank, and devices communicating through the conduit the movement of the float to the valve, said devices comprising a rod extending upwardly in the conduit, and a connection between the rod and valve and between the rod and the float.

3. In a tank discharge controlling mechanism, the combination of a tank; a discharge conduit leading from the tank; and means closing the conduit at a pre-determined level of liquid in the tank comprising a float, a valve in the conduit outside of the tank, and devices communicating through the conduit the movement of the float to the valve.

In testimony whereof I have hereunto set my hand.

NELSON A. CARLSON.